United States Patent
Low et al.

(10) Patent No.: US 12,396,039 B2
(45) Date of Patent: Aug. 19, 2025

(54) CONTENTION RESOLUTION IN WIRELESS COMMUNICATION SYSTEMS

(71) Applicant: GREATER SHINE LIMITED, New Taipei (TW)

(72) Inventors: Su-Lin Low, San Diego, CA (US); Tianan Ma, San Diego, CA (US); Hong Kui Yang, San Diego, CA (US); Hausting Hong, San Diego, CA (US); Chun-I Lee, San Diego, CA (US)

(73) Assignee: GREATER SHINE LIMITED, New Taipei (TW)

( * ) Notice: Subject to any disclaimer, the term of this patent is extended or adjusted under 35 U.S.C. 154(b) by 446 days.

(21) Appl. No.: 17/939,746

(22) Filed: Sep. 7, 2022

(65) Prior Publication Data

US 2023/0007703 A1 Jan. 5, 2023

Related U.S. Application Data

(63) Continuation of application No. PCT/US2021/017152, filed on Feb. 9, 2021.
(Continued)

(51) Int. Cl.
*H04W 74/08* (2024.01)
*H04L 1/00* (2006.01)
(Continued)

(52) U.S. Cl.
CPC ....... *H04W 74/0841* (2013.01); *H04L 1/0061* (2013.01); *H04W 80/02* (2013.01)

(58) Field of Classification Search
CPC ............ H04W 74/0841; H04W 80/002; H04L 1/0061
See application file for complete search history.

(56) References Cited

U.S. PATENT DOCUMENTS

| | | |
|---|---|---|
| 2008/0019306 A1 | 1/2008 | Damnjanovic |
| 2009/0163211 A1 | 6/2009 | Kitazoe et al. |

(Continued)

FOREIGN PATENT DOCUMENTS

CN 109804697 A 5/2019

OTHER PUBLICATIONS

First Examination Opinion Notice issued in corresponding Chinese Application No. 202180020452.4, dated Sep. 10, 2024, 12 pages.
(Continued)

*Primary Examiner* — Derrick V Rose
(74) *Attorney, Agent, or Firm* — BAYES PLLC

(57) ABSTRACT

Embodiments of apparatus and method for random access are disclosed. In an example, a user equipment can include at least one processor and at least one memory including computer program code. The at least one memory and the computer program code can be configured to, with the at least one processor, cause the user equipment at least to send a trigger message and unique identifier in a first message from the user equipment to a network node. The at least one memory and the computer program code can also be configured to, with the at least one processor, cause the user equipment at least to receive an acknowledgement at the user equipment in a second message from the network node using the user equipment's unique identifier. Contention resolution for the user equipment can be concluded with only the first message and the second message.

15 Claims, 11 Drawing Sheets

Related U.S. Application Data

(60) Provisional application No. 62/992,269, filed on Mar. 20, 2020.

(51) Int. Cl.
*H04W 74/0833* (2024.01)
*H04W 80/02* (2009.01)

(56) References Cited

U.S. PATENT DOCUMENTS

| | | | |
|---|---|---|---|
| 2011/0222475 A1 | 9/2011 | Hole et al. | |
| 2019/0357272 A1 | 11/2019 | Lim et al. | |
| 2020/0120713 A1* | 4/2020 | Yerramalli | H04W 52/50 |
| 2020/0260498 A1* | 8/2020 | Xu | H04W 52/36 |
| 2020/0404711 A1* | 12/2020 | Zhao | H04W 74/0836 |
| 2021/0219349 A1* | 7/2021 | Huang | H04W 74/0836 |

OTHER PUBLICATIONS

International Search Report issued in International application No. PCT/US2021/017152, mailed Apr. 28, 2021.
Written Opinion of the International Searching Authority issued in International application No. PCT/US2021/017152, mailed Apr. 28, 2021.
Decision of Rejection issued in corresponding Chinese Application No. 202180020452.4, mailed on Apr. 25, 2025, 14 pages.

* cited by examiner

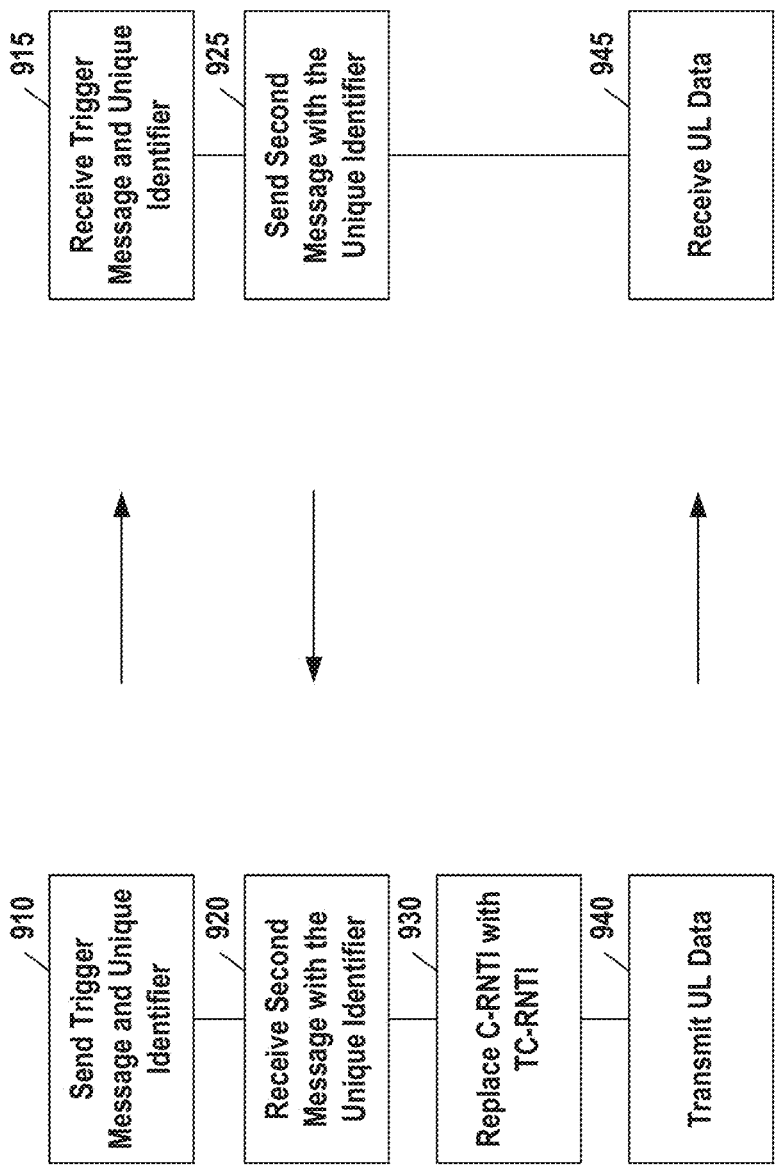

CONTENTION RESOLUTION IN WIRELESS COMMUNICATION SYSTEMS

CROSS-REFERENCE TO RELATED APPLICATIONS

This application is a continuation of International Application No. PCT/US2021/017152 filed on Feb. 9, 2021, entitled "CONTENTION RESOLUTION IN WIRELESS COMMUNICATION SYSTEMS", which claims the benefit of priority to U.S. Provisional Application No. 62/992,269 filed on Mar. 20, 2020, entitled "OPTIMIZED CONTENTION RESOLUTION SCHEME TO ENHANCE 5G UPLINK RANDOM ACCESS PERFORMANCE," both of which are hereby incorporated by reference in their entireties.

BACKGROUND

Embodiments of the present disclosure relate to apparatuses and methods for wireless communication.

Wireless communication systems are widely deployed to provide various telecommunication services such as telephony, video, data, messaging, and broadcasts. In wireless communications, there may be wireless devices competing for access to communication resources. For example, certain wireless communication systems may permit random access to channels by a user equipment.

SUMMARY

Embodiments of apparatus and method for random access are disclosed herein.

In one example, a user equipment can include at least one processor and at least one memory including computer program code. The at least one memory and the computer program code can be configured to, with the at least one processor, cause the user equipment at least to send a trigger message and unique identifier in a first message from the user equipment to a network node. The at least one memory and the computer program code can also be configured to, with the at least one processor, cause the user equipment at least to receive an acknowledgement at the user equipment in a second message from the network node using the user equipment's unique identifier. Contention resolution for the user equipment can be concluded with only the first message and the second message.

In another example, a network node can include at least one processor and at least one memory including computer program code. The at least one memory and the computer program code can be configured to, with the at least one processor, cause the user equipment at least to receive a trigger message and unique identifier in a first message from a user equipment at the network node. The at least one memory and the computer program code can also be configured to, with the at least one processor, cause the user equipment at least to send an acknowledgement to the user equipment in a second message from the network node using the user equipment's unique identifier. Contention resolution for the user equipment can be concluded with only the first message and the second message.

In a further example, a method of random access by a user equipment can include sending a trigger message and unique identifier in a first message from the user equipment to a network node. The method can also include receiving an acknowledgement at the user equipment in a second message from the network node using the user equipment's unique identifier. Contention resolution for the user equipment can be concluded with only the first message and the second message.

In an additional example, a method of random access of a network node can include receiving a trigger message and unique identifier in a first message from a user equipment at the network node. The method can also include sending an acknowledgement to the user equipment in a second message from the network node using the user equipment's unique identifier. Contention resolution for the user equipment can be concluded with only the first message and the second message.

BRIEF DESCRIPTION OF THE DRAWINGS

The accompanying drawings, which are incorporated herein and form a part of the specification, illustrate embodiments of the present disclosure and, together with the description, further serve to explain the principles of the present disclosure and to enable a person skilled in the pertinent art to make and use the present disclosure.

FIG. 9A illustrates a method of random access by a user equipment, according to certain embodiments of the present disclosure.

FIG. 9B illustrates method of random access of a network node, according to certain embodiments of the present disclosure.

Figure 1:
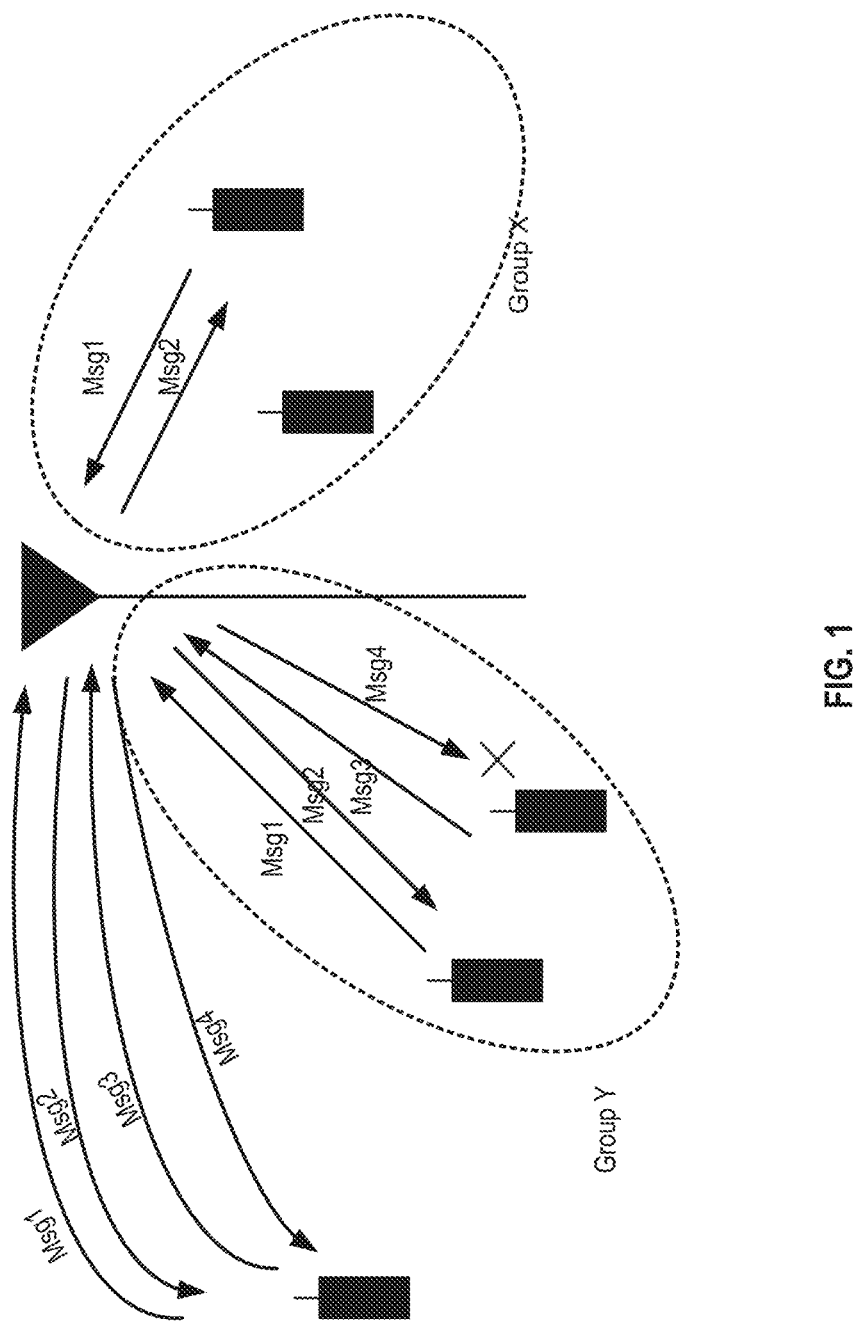
FIG. 1 illustrates an overview diagram of fifth-generation (5G) random access contention resolution procedures.

Embodiments of the present disclosure will be described with reference to the accompanying drawings.

DETAILED DESCRIPTION

Although specific configurations and arrangements are discussed, it should be understood that this is done for illustrative purposes only. A person skilled in the pertinent art will recognize that other configurations and arrangements can be used without departing from the spirit and scope of the present disclosure. It will be apparent to a person skilled in the pertinent art that the present disclosure can also be employed in a variety of other applications.

It is noted that references in the specification to "one embodiment," "an embodiment," "an example embodiment," "some embodiments," "certain embodiments," etc., indicate that the embodiment described may include a particular feature, structure, or characteristic, but every embodiment may not necessarily include the particular feature, structure, or characteristic. Moreover, such phrases do not necessarily refer to the same embodiment. Further, when a particular feature, structure, or characteristic is described in connection with an embodiment, it would be within the knowledge of a person skilled in the pertinent art to effect such feature, structure, or characteristic in connection with other embodiments whether or not explicitly described.

In general, terminology may be understood at least in part from usage in context. For example, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Various aspects of wireless communication systems will now be described with reference to various apparatus and methods. These apparatus and methods will be described in the following detailed description and illustrated in the accompanying drawings by various blocks, modules, units, components, circuits, steps, operations, processes, algorithms, etc. (collectively referred to as "elements"). These elements may be implemented using electronic hardware, firmware, computer software, or any combination thereof. Whether such elements are implemented as hardware, firmware, or software depends upon the particular application and design constraints imposed on the overall system.

The techniques described herein may be used for various wireless communication networks, such as code division multiple access (CDMA) system, time division multiple access (TDMA) system, frequency division multiple access (FDMA) system, orthogonal frequency division multiple access (OFDMA) system, single-carrier frequency division multiple access (SC-FDMA) system, and other networks. The terms "network" and "system" are often used interchangeably. A CDMA network may implement a radio access technology (RAT), such as Universal Terrestrial Radio Access (UTRA), CDMA 2000, etc. A TDMA network may implement a RAT, such as Global System for Mobile communication (GSM). An OFDMA network may implement a RAT, such as Long-Term Evolution (LTE) or New Radio (NR). The techniques described herein may be used for the wireless networks and RATs mentioned above, as well as other wireless networks and RATs.

In a 5G cellular wireless modem, the user equipment can initiate a random access procedure to establish connection and synchronization with the Base Station (BS). Contention-free random access can be done with a two-message sequence, while a contention-based random access procedure can be done with a four-message sequence, where each message or stage is respectively labeled, Msg1, Msg2, Msg3, and Msg4.

Figure 2:
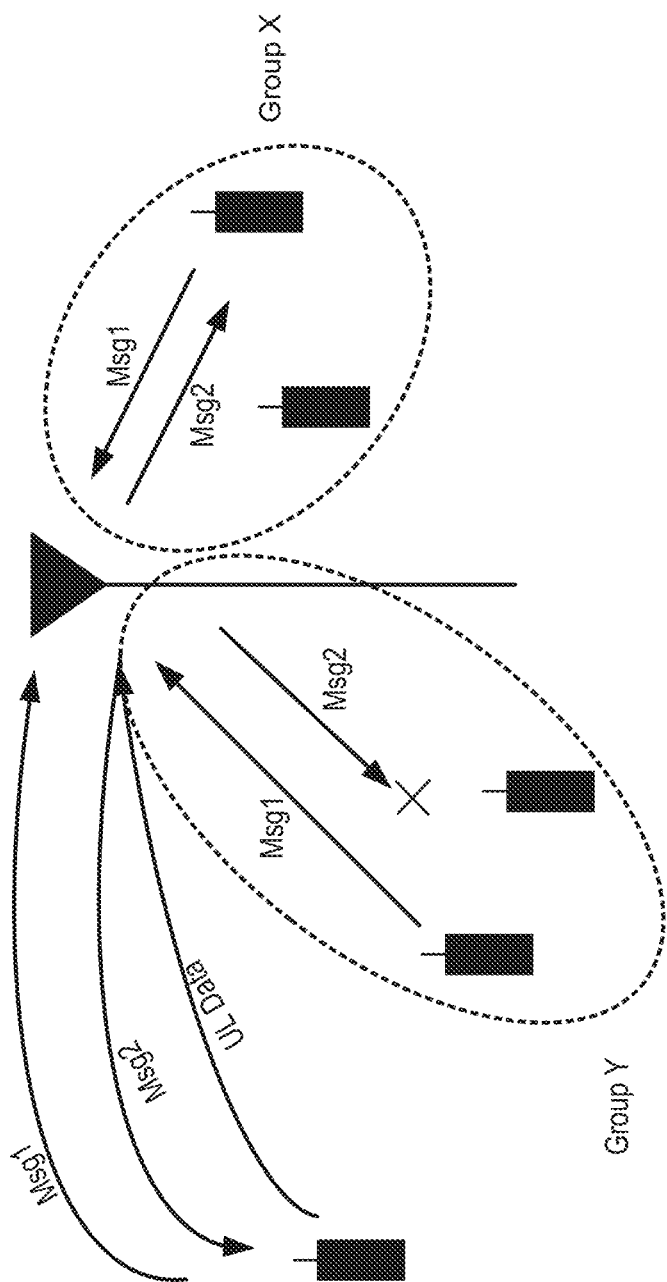
FIG. 2 illustrates message flows of 5G random access contention resolution procedures.

FIG. 1 illustrates an overview diagram of 5G random access contention resolution procedures. FIG. 2 illustrates message flows of 5G random access contention resolution procedures.

There are at least two types of random access (RA): contention-free random access and contention-based random access. In a contention-free random access procedure, the preamble index, which determines the preamble sequence, can be pre-assigned by the base station to the user equipment (UE). Hence it can be guaranteed that there are no conflicts with the surrounding UEs, and the user equipment can be guaranteed the resource at the base station. In this approach, the user equipment can simply send Msg1 and Msg2 to complete the random access procedure.

In contention-based random access, the preamble Index may not be pre-allocated. Thus, the user equipment may perform logic to select a random access preamble index (RAPID). In this case, the random access procedures may require four messages to complete the random access procedure: Msg1, Msg2, Msg3, and Msg4.

Msg1 may be communicated over PRACH and may include an RA radio network temporary identifier (RA-RNTI) and a RAPID. Msg2 may be communicated over physical downlink shared channel (PDSCH), may be a random access response (RAR), and may include a RAPID matching the RAPID from Msg1. Msg3 may be communicated over PDSCH and may include CCCH or DCCH/DTCH and may also include a C-RNTI MAC CE. Msg4 may be communicated over PDSCH and may include CR MAC CE with a value to match Msg3 or may be communicated over PDCCH, and success may be achieved if C-RNTI can be successfully decoded by the user equipment.

The user equipment can first select the RAPID and then can select a physical random access channel (PRACH) channel with corresponding transmission parameters (for example, slot, symbol, frequency, and carrier), and can then send Msg1 to the base station.

Group X in FIG. 1 illustrates a case where the base station may receive multiple user equipment requests with the same PRACH, but with different RAPID. In the cases illustrated by Group X, there may be no conflict among user equipment. As a result, the base station can include the RAPID and uplink (UL) grant into Msg2, which is a random access response message for each different user equipment with different RAPID. Then each user equipment that decodes the physical downlink control channel (PDCCH) with a RA-RNTI (corresponding to the PRACH transmission parameters) would continue to decode the RAR and look for the matching RAPID for further random access steps.

Group Y in FIG. 1 illustrates a case where the base station may receive multiple access Msg1 messages on the same PRACH with the exact same RAPID. Each user equipment in such a case is now in conflict with the other UEs that have the same RAPID. However, the UEs do not know about this conflict, and consequently, each user equipment may continue by sending its own Msg3 on a physical uplink shared channel (PUSCH), with the given UL grant in Msg2 under the same RAPID.

In order to resolve this contention, the base station can select a winning user equipment and can send contention resolution information in Msg4. This can be in the form of a contention resolution medium access control (MAC) control element (CE) or encoding the PDCCH with the cell radio network temporary identifier (C-RNTI) that the winning user equipment sent.

When the user equipment receives Msg4, there may be two different cases, as illustrated more clearly in FIG. 2. For a common control channel (CCCH) message trigger, the user equipment may compare the CR-MAC CE. For a dedicated control channel (DCCH) or dedicated traffic channel (DTCH) message trigger, the user equipment may determine if the PDCCH decode is successful with the user equipment's own C-RNTI. Under either option, the processing of Msg4 can conclude the random access procedure, the user equipment can declare random access success, and can continue normal data sending/receiving.

A challenge in 5G UL MAC contention-based random access transmission is in the complexity, long delay, and inefficiency of the message procedure to resolve the contention.

The contention-resolution logic can be spread across different layers and functions for CCCH-based and DCCH/DTCH-based random access, where the former may require matching of CCCH contents, which is the responsibility of the MAC layer, while the latter may require the successful decode of PDCCH corresponding to a present RNTI, which is typically done by the physical (PHY) layer.

Such approaches may require complex random access logic that spans multiple layers of involvement including radio resource control (RRC), MAC, and PHY layers. The contention-resolution logic may be inconsistent between CCCH-based and DCCH/DTCH based random access, where the former may require inefficient matching of CCCH contents, while the latter may require the successful decoding of PDCCH, which may be done by separate functions such as the PHY layer. There can also be inefficient resource usage in the user equipment, such as requiring the user equipment to use four messages for random access contention resolution.

These complexities and inefficiencies may also lead to further issues. For example, there may be increased power usage in the user equipment, causing interference in the network. There may also be delayed random access success results. Furthermore, there may be delayed random access failure results, which may result in wastage of time and memory space. Furthermore, there may be a slower response to random access, delaying connection setup and handoff establishment.

For low latency applications such as ultra-reliable low-latency communication (URLLC), a minimum delay fast scheduling scheme is required, which needs to be able to adapt to different traffic types.

In certain embodiments of the present disclosure, a 5G UL MAC layer method is provided, which may optimize random access contention resolution to enhance low latency applications such as ultra-reliable low-latency communication.

A method of certain embodiments of the present disclosure may complete the contention resolution with two messages and may also streamline the contention resolution method to be performed at one entity.

Certain embodiments may include any of the following aspects. The user equipment may send a trigger message and unique identifier in Msg1. The base station may then acknowledge the user equipment in Msg2 using the user equipment's unique identifier. Thus, in certain embodiments of the present disclosure, contention resolution can be accomplished with only two messages: Msg1 and Msg2.

More particularly, with respect to sending the trigger message and a unique identifier in Msg1, the user equipment can trigger a contention-based random access procedure by including a trigger message and a unique identifier in Msg1, the first message in the access attempt. In order for the base station to acknowledge the user equipment in Msg2 with the user equipment's unique identifier, given multiple user equipment access attempts with the same PRACH and preamble index, the base station can select a winning user equipment and can then use the unique identifier to acknowledge the user equipment in Msg2.

Thus, in certain embodiments of the present disclosure, the contention can be resolved with only two messages: Msg1 and Msg2. This approach may allow the winning user equipment to declare random access success faster. This approach may also allow the non-winning user equipment to declare random access failure sooner and retry earlier as soon as possible.

Figure 3:
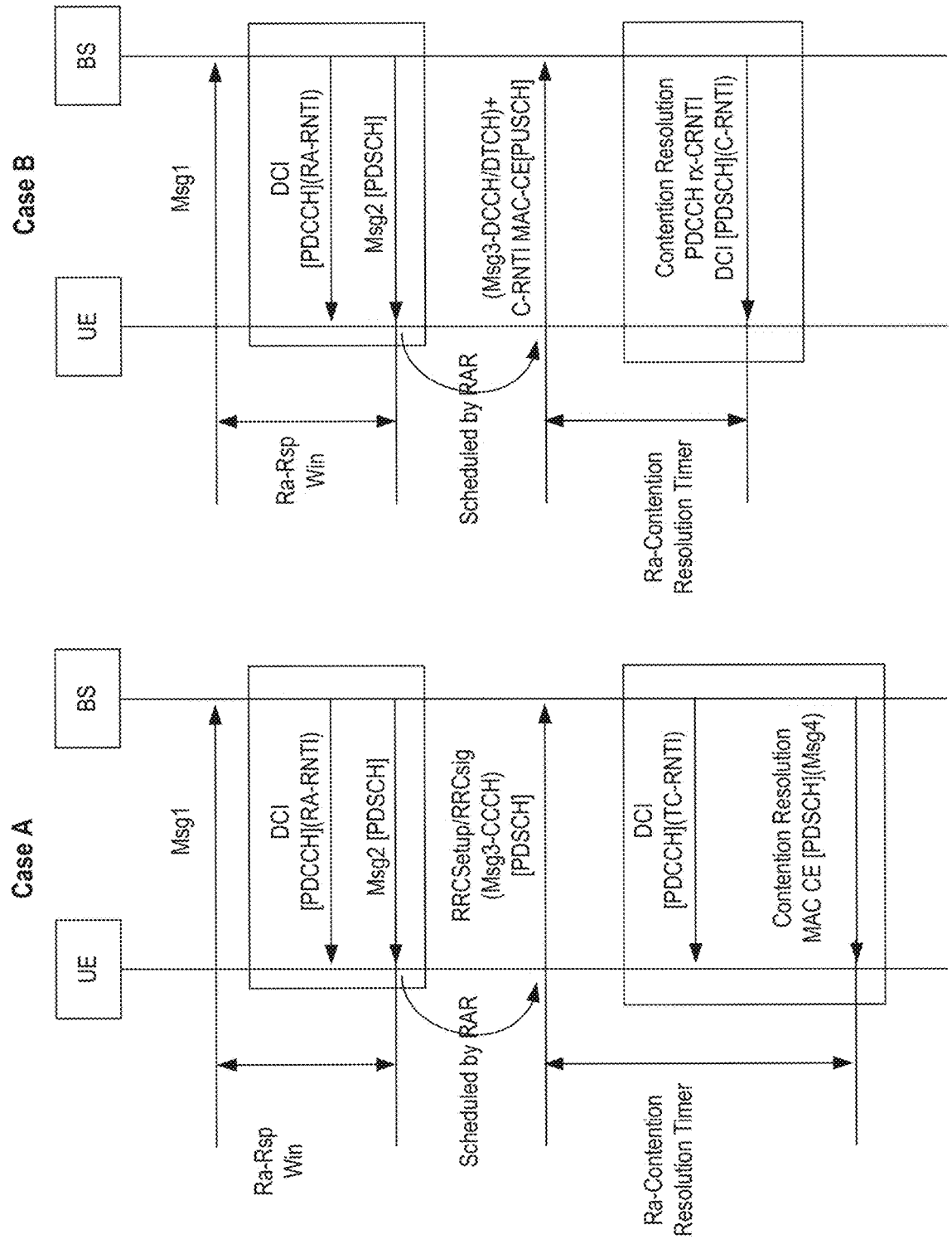
FIG. 3 illustrates an overview diagram of random access contention resolution procedures according to certain embodiments of the present disclosure.

FIG. 3 illustrates an overview diagram of random access contention resolution procedures according to certain embodiments of the present disclosure.

As mentioned above, in a contention-based random access procedure, the user equipment is not pre-allocated a preamble index sequence in advance. Hence it needs to randomly select a Preamble Index (RAPID) from a pool of common resources within the cell it is attached. This RAPID determines the preamble sequence the user equipment transmits in the Msg1 access channel message to start the Random Access procedure.

The base station may receive many such PRACH access channel requests from multiple UEs. Within the same PRACH, several UEs may use different PRACH PreambleID (RAPID) (Group X); hence there is no conflict. However, some UEs may select and use the same RAPID, which is in conflict with the current user equipment (Group Y). The base station then has to choose one user equipment for this PRACH and PreambleID (RAPID). Such contention-based random access requires a contention resolution scheme in order to allocate the resource to one winning user equipment access request.

In order to expedite the random access procedure for contention-based random access, in certain embodiments of the present disclosure, the Msg1 of the contention-based random access can include the trigger message (for example, CCCH/DCCH/DTCH message or data), as well as a unique identifier: a hash identifier (HashID) can be included in a RACH MAC CE, if CCCH message, or a C-RNTI can be included in a C-RNTI MAC CE if DCCH/DTCH message. The HashID can be generated from a 24-bit cyclic redundancy check (CRC) of the CCCH message, using a hash function.

If the base station accepts this user equipment and allocates resources to it, the base station can send the unique identifier back in Msg2 to acknowledge the user equipment immediately, instead of two additional messages exchange of Msg3 and Msg4 in other approaches.

Thus, the winning user equipment may only require Msg1 and Msg2 to resolve a contention-based random access and declare success quickly, enhancing random access performance in a way that may be particularly beneficial for low latency applications, such as URLLC applications. This situation is illustrated as Group X in FIG. 2.

The rest of the UEs, as shown in Group Y in FIG. 2, can also declare random access failure early and retry their random access again quickly, without waiting for Msg3 and Msg4 and wasting precious time and bandwidth over-the-air and user equipment resources.

Two cases can be considered for random access triggers: a first case is a CCCH random access trigger, while the second case is a DCCH/DTCH random access trigger.

FIG. 3 illustrates Msg1 for a random access trigger according to certain embodiments of the present disclosure. This case, which can be referred to for convenience as case A, can be the case where a CCCH message is triggered to be sent in the Random Access procedure.

Figure 4A:
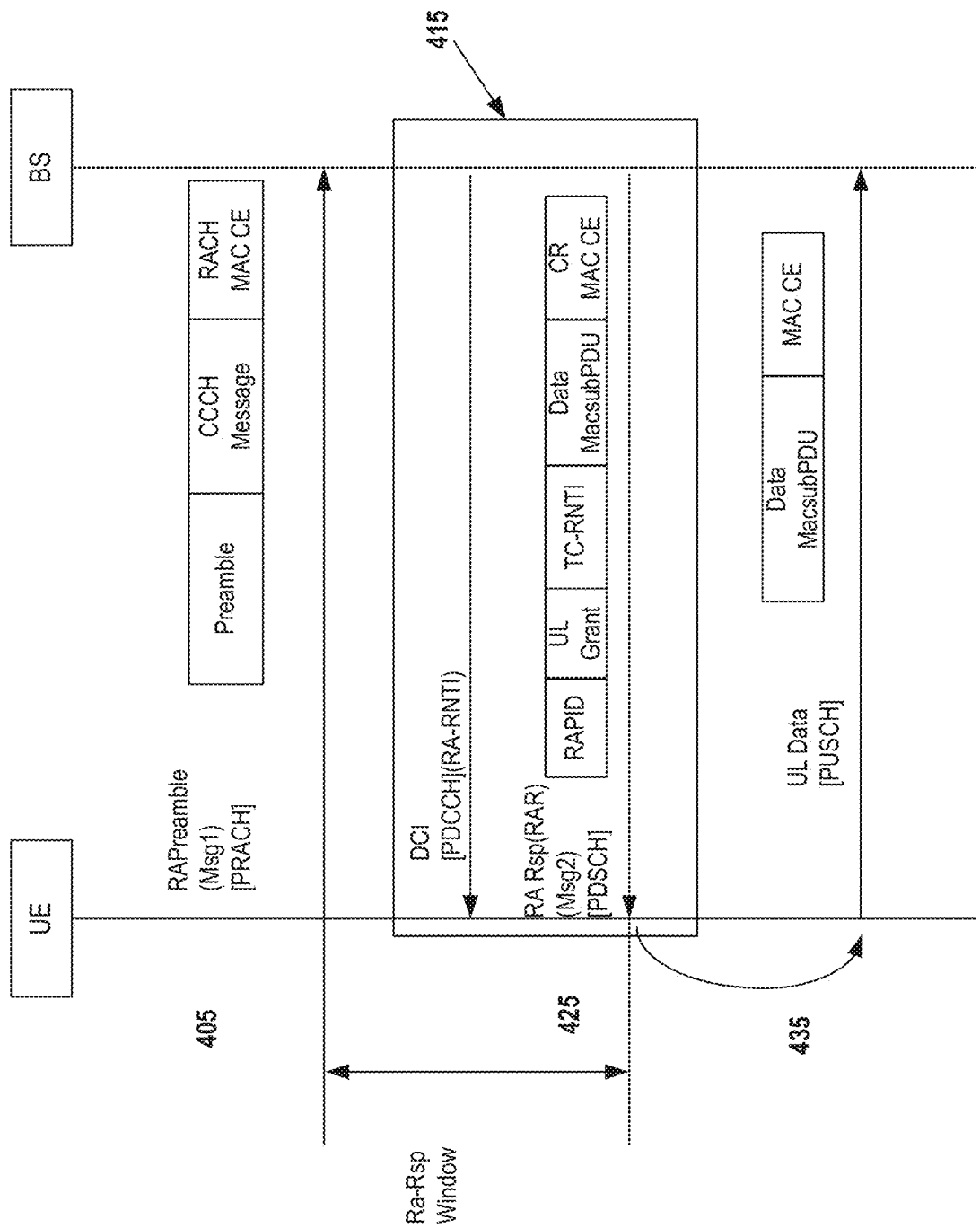
FIG. 4A illustrates a message flow diagram corresponding to Message 1 (Msg1) for a random access trigger according to certain embodiments of the present disclosure.

FIG. 4A illustrates a message flow diagram corresponding to the Msg1 of case A shown in FIG. 3, according to certain embodiments of the present disclosure. As shown in FIG. 4A, at 405, the user equipment can send Msg1 to the base station, and the base station can receive Msg1.

The user equipment can send a PRACH access channel message that includes a CCCH message 410 and a RACH MAC CE 420 on a PRACH access channel with selected transmission parameters (slot, symbol, frequency, carrier) corresponding to a random access identifier, such as an RA-RNTI. This RA-RNTI can be used by the base station to scramble the CRC of the upcoming PDCCH for Msg2 corresponding to the user equipment transmitted PRACH channel, which is discussed in more detail below.

Figure 4B:
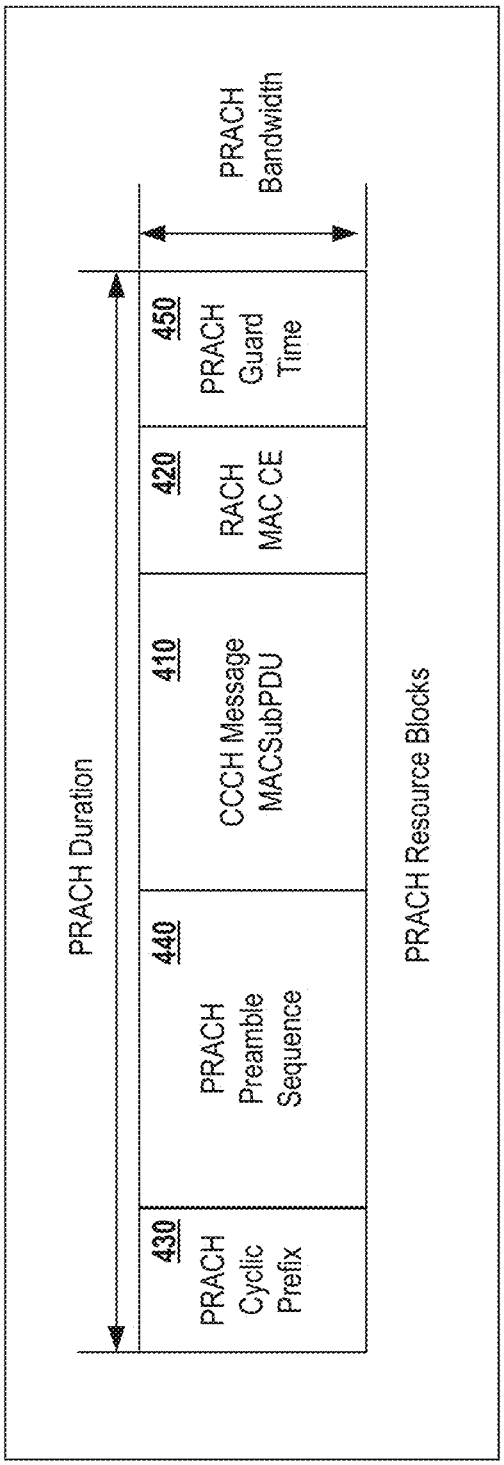
FIG. 4B illustrates the Msg1 shown in FIG. 4A, according to certain embodiments of the present disclosure.

Msg1 can be made up of PRACH resource blocks and can have an overall PRACH duration and consume an amount of PRACH bandwidth, as shown in FIG. 4B. In addition to the CCCH message 410 and the RACH MAC CE 420, Msg1 can also include a PRAC cyclic prefix 430 and a PRACH preamble sequence 440, which may correspond to a selected preamble index (PreambleID). A PRACH guard time 450 can simply be an unused portion of time up to the end of the last subframe occupied by the PRACH.

The RACH MAC CE 420 can contain a HashID, which can be generated based on a unique 24-bit CRC for the CCCH message. This HashID can be used for identifying the contention resolution for this user equipment competing for this PRACH channel with other UEs.

As shown in FIG. 4A, at 415, the base station can send Msg2 to the user equipment and the user equipment can receive Msg2. The base station may receive many PRACH access channel requests from multiple UEs. Within the same PRACH, several UEs may use different PRACH PreambleIDs, namely RAPIDs (Group X), and some of them may even select and use the same RAPID, which are in conflict with the current user equipment (Group Y). The base station can then choose one user equipment for this PRACH and RAPID.

If the base station acknowledges a given user equipment, the base station can encode the PDCCH CRC with the RA-RNTI corresponding to the PRACH parameters (slot, symbol, frequency, carrier) as specified in the 3GPP standards. Thus, at 415, the base station can send Msg2, which can be considered a random access response, with a RAPID that matches the user equipment's PreambleID, a CR MAC CE with the same HashID as received in the user equipment's RACH MAC CE, a temporary cell radio network temporary identifiers (TC-RNTI) assigned by the base station to this user equipment, and any DL data medium access control sub-packet data units (MacSubPDUs) in response to the CCCH message. For example, in an RRC connection setup, if an RRCSetupRequest message was sent in Msg1, then an RRCSetup message may be sent in Msg2. The Msg2 from the base station may also include a UL grant for the next UL data on PUSCH.

As shown in FIG. 4A, at 425, the user equipment can decode and process PDCCH and Msg2. The user equipment may perform the following upon receipt of PDCCH and Msg2. First, the user equipment may decode the PDCCH that has CRC scrambled with the corresponding RA-RNTI constructed from the selected PRACH transmit information. If PDCCH decode is successful, the user equipment can decode the PDSCH corresponding to Msg2, namely the RAR.

Second, upon Msg2 decode success, the user equipment can check the contents of Msg2 to determine whether RAPID matches the user equipment's own selected PreambleID that was sent in Msg1 and whether the CR MAC CE's HashID matches the user equipment's Msg1 HashID sent.

If both match, then the user equipment can set the user equipment's own C-RNTI to be the TC-RNTI provided by the base station. Also, the user equipment can declare the Random Access procedure successful at this point. No further Msg3 or Msg4 is required. Instead, contention resolution can be deemed resolved by Msg2 processing.

If the above the RAPID in Msg2 does not match the UE's own selected PreambleID and/or the CR MAC CE's HashID does not match the UE's Msg1 HashID, then user equipment can take further steps. For example, if RAPID does not match for any Msg2 RAPID, then the user equipment can reselect a different PreambleID, and then the user equipment can retry the random access procedure with another PRACH Msg1. If RAPID matches, but the CR MAC CE's HashID does not match the user equipment's Msg1 HashID, then the user equipment can retry the random access procedure with another PRACH Msg1.

As further shown in FIG. 4A, at 435, the user equipment can send UL data on PUSCH. If the random access procedure is successful, the user equipment sends UL data on PUSCH with the UL grant given in Msg2. This UL data may include a DCCH message, such as RRC setup complete.

Note that the user equipment may send a short buffer status report (BSR) MAC CE in Msg1 to request for UL grant for its buffered user data. If so, the base station may provide a UL grant in Msg2 for the next UL data, in addition to signaling data needed for connection setup such as RRC setup complete.

FIG. 3 also illustrates Msg1 for another random access trigger according to certain embodiments of the present disclosure. This case, which can be referred to for convenience as case B, can be the case where a DCCH message or DTCH message 510 is triggered to be sent in the random access procedure. Here, the C-RNTI MAC CE 520 is used instead of the RACH MAC CE, since the user equipment is already assigned a C-RNTI.

Figure 5A:
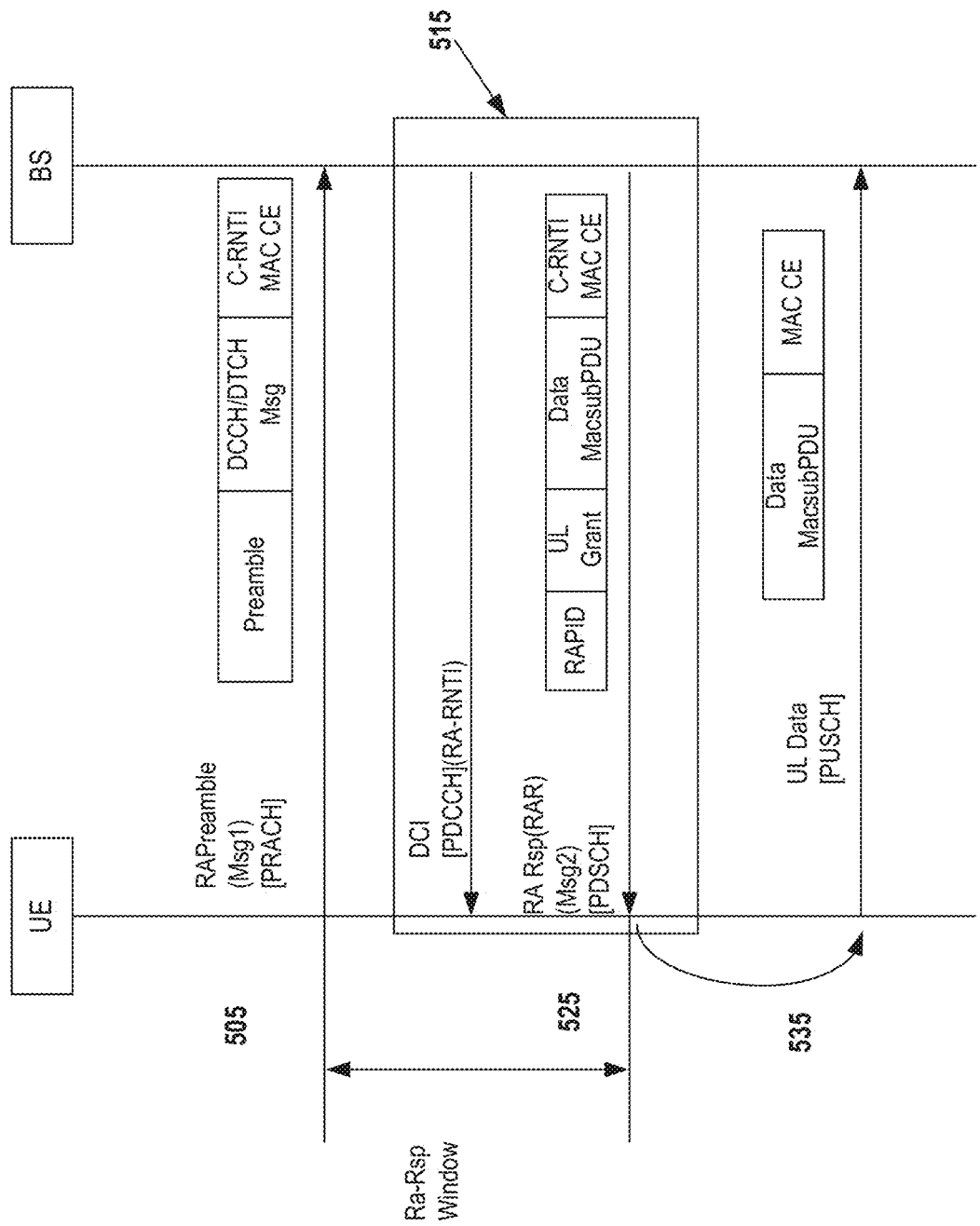
FIG. 5A illustrates a message flow diagram corresponding to Msg1 for another random access trigger according to certain embodiments of the present disclosure.

FIG. 5A illustrates a message flow diagram corresponding to the Msg1 of case B shown in FIG. 3, according to certain embodiments of the present disclosure.

As shown in FIG. 5A, at 505, the user equipment can send Msg1 to the base station, and the base station can receive the Msg1. The user equipment can send a PRACH access channel message that includes a DCCH/DTCH msg and a C-RNTI MAC CE on a PRACH access channel with selected transmission parameters (slot, symbol, frequency, carrier) corresponding to Random Access identifier (RA-RNTI). This RA-RNTI is used by the base station to scramble the CRC of the upcoming PDCCH for Msg2 corresponding to the user equipment transmitted PRACH channel.

Figure 5B:
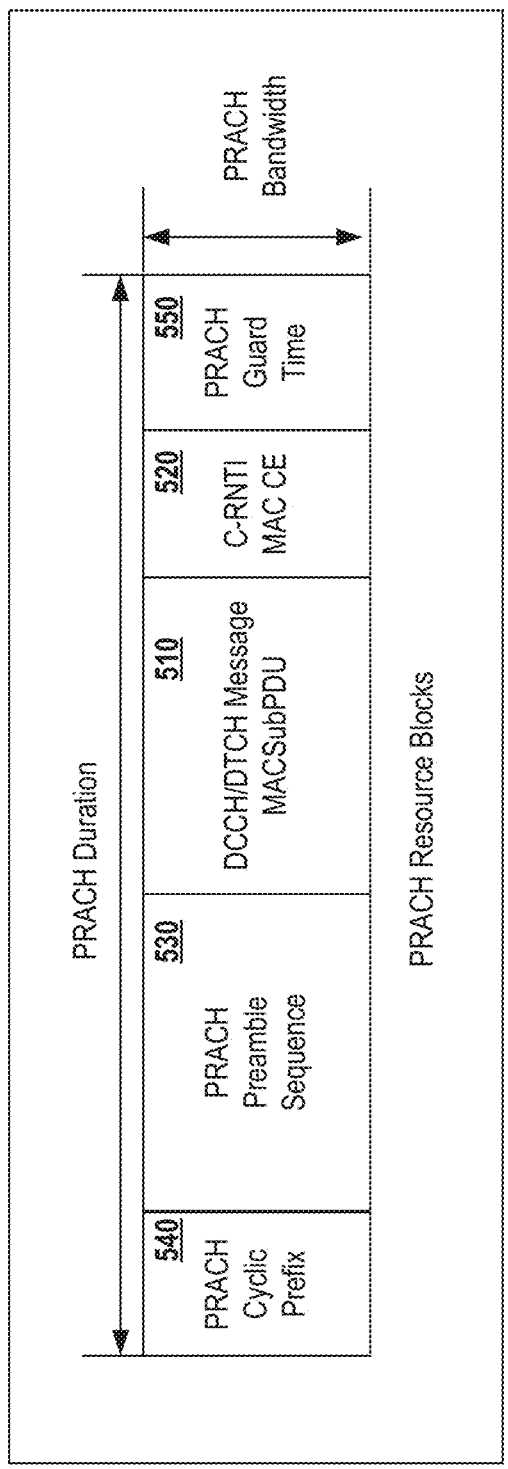
FIG. 5B illustrates the Msg1 shown in FIG. 5A, according to certain embodiments of the present disclosure.

As shown in FIG. 5B, the Msg1 can include a preamble sequence 530 corresponding to a selected preamble index (PreambleID), which can also be referred to as a RAPID. The Msg1 can also include DCCH/DTCH message 510 in a DCCH/DTCH message MACSubPDU. As with the Msg1 in FIG. 4B, the Msg1 in FIG. 5B can also include a PRACH cyclic prefix 540. PRACH guard time 550 may be unused resources as explained above.

As also shown in FIG. 5B, the Msg1 can include C-RNTI MAC CE 520, which can contain the current C-RNTI assigned to the user equipment. This C-RNTI can be used for resolving the contention resolution for this user equipment competing for this PRACH channel with other UEs.

As shown in FIG. 5A, at 515, the base station can send the Msg2 to the user equipment. The base station may receive many PRACH access channel requests from multiple UEs. Within the same PRACH, several UEs may use different PRACH PreambleIDs or RAPIDs (Group X), and some of them may even select and use the same RAPID, which would thus be in conflict with the current user equipment (Group Y). The base station may then choose one user equipment for this PRACH and PreambleID, also referred to as RAPID.

If the base station acknowledges a given user equipment, the base station can send the following to the user equipment in Msg2: the PDCCH CRC encoded with the RA-RNTI corresponding to the PRACH parameters (slot, symbol, frequency, carrier) as specified in the 3GPP standards and a random access response. The random access response can include a RAPID that matches the user equipment's PreambleID and a C-RNTI MAC CE, which can be the same C-RNTI as received in the user equipment's C-RNTI MAC CE. The Msg2 can also include any DL data MacSubPDUs in response to the DCCH/DTCH message and a UL grant for the next UL data on PUSCH.

As shown in FIG. 5A, at 525, the user equipment can decode and process PDCCH and Msg2. Upon receipt of PDCCH and Msg2, the user equipment can decode the PDCCH that has CRC scrambled with the corresponding RA-RNTI constructed from the selected PRACH transmit information. If PDCCH decode is successful, the user equipment can decode the PDSCH corresponding to Msg2 (RAR).

Upon Msg2 decode success, the user equipment can check the contents of Msg2 to determine whether the RAPID matches the UE's own selected PreambleID that was sent in Msg1 and to determine whether the C-RNTI in the C-RNTI MAC CE matches the C-RNTI the user equipment sent in Msg1. If both matches occur, then the user equipment can declare the random access procedure successful. No further Msg3 or Msg4 is required for the random access procedure. The contention resolution can be resolved by Msg2 processing.

If one or more of the RAPID and/or C-RNTI do not match, the user equipment can perform the following procedures. For example, if the RAPID does not match for any Msg2 RAPID, then the user equipment can reselect a different PreambleID, and then the user equipment can retry the random access procedure with another PRACH Msg1. If the RAPID matches, but if the C-RNTI does not match to the user equipment's Msg1 C-RNTI, then the user equipment can retry the random access procedure with another PRACH Msg1.

As shown in FIG. 5A, at 535, the user equipment can send UL data on PUSCH. If the random access procedure is successful, the user equipment can send UL data on PUSCH, with the UL grant given in Msg2. This may include DCCH or DTCH data. The user equipment may send a short BSR MAC CE in Msg1 to request for UL grant for its buffered user data. If so, the base station may provide UL grant in Msg2 for the next UL data. Thus, certain embodiments of the present disclosure may allow the user equipment to expedite the random access procedure. Moreover, certain embodiments of the present disclosure may enhance user equipment performance, especially for URLLC applications.

Certain embodiments of the present disclosure may have various benefits and/or advantages. For example, certain embodiments may provide a straightforward, practical scheme with minimal software complexity. Additionally, certain embodiments may permit declaring random access success faster. Furthermore, certain embodiments may permit declaring random access failure sooner and retry earlier if a failure occurs. Furthermore, certain embodiments may eliminate inefficient contention resolution checking with more messages. Also, certain embodiments may eliminate complex implementation with multiple stages in the random access procedure. Certain embodiments may also eliminate unnecessary memory and cycles to process up to four messages, even if resources were not allocated for the user equipment. Additionally, certain embodiments may provide improved user equipment power with reduced messages. Certain embodiments may further provide reduced interference levels to other UEs. Certain embodiments may also allow the network to re-allocate unused time and frequency resources for other UEs.

There may be various modifications or changes to the approaches described above. For example, different unique identifiers can be generated to be sent in the RACH MAC CE of Msg1, such as the output of any desired hash function. The trigger access message, for example, CCCH/DCCH/DTCH or the like message, can be sent after the random access is successful with Msg2. This approach may allow the preamble and unique identifier in Msg1 to be more compact and may be more easily acquired by the base station.

Figure 7:
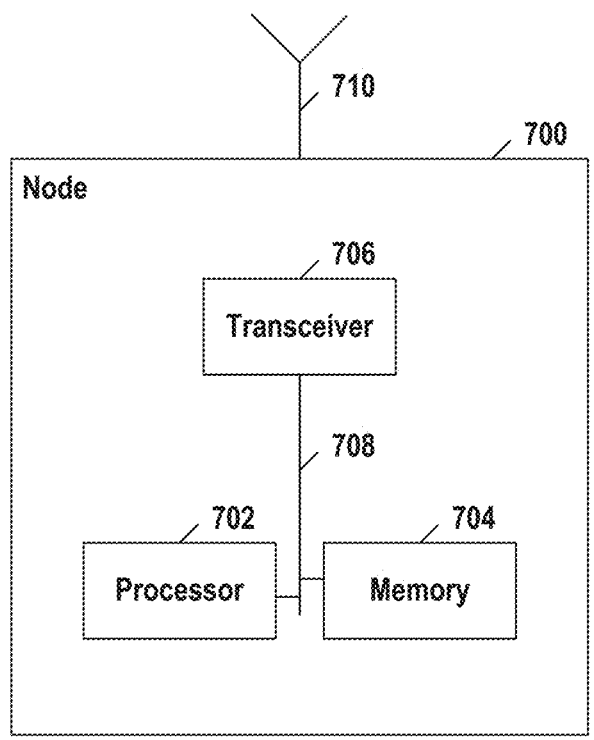
FIG. 7 illustrates an example node, in which some aspects of the present disclosure may be implemented, according to some embodiments of the present disclosure.
Figure 8:
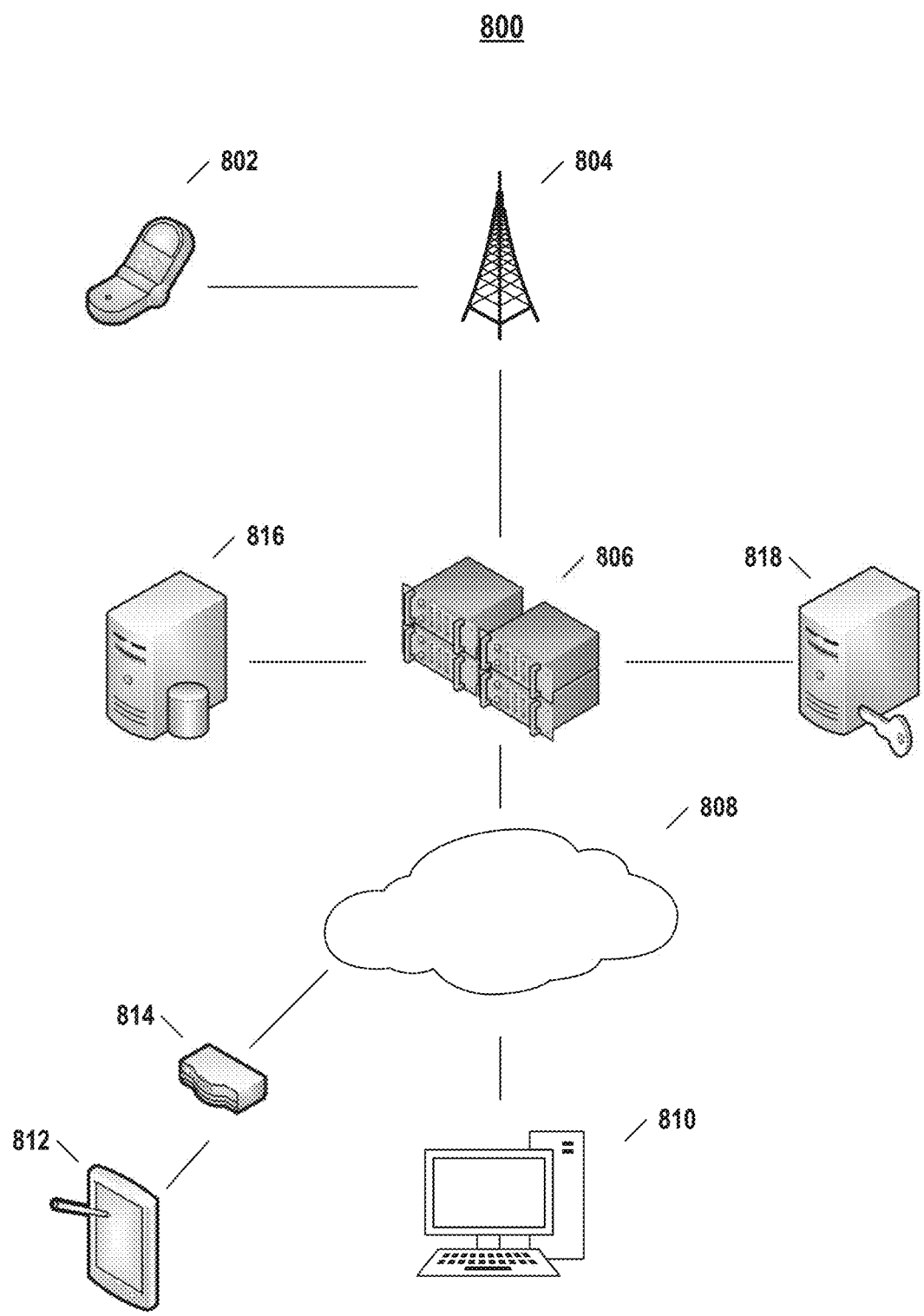
FIG. 8 illustrates an example wireless network, in which some aspects of the present disclosure may be implemented, according to some embodiments of the present disclosure.

The software and hardware methods and systems disclosed herein, such as the methods illustrated in FIGS. 3, 4A, 4B, 5A, 5B, 9A, and 9B may be implemented by any suitable nodes in a wireless network. For example, FIGS. 6 and 7 illustrate respective apparatuses 600 and 700, and FIG. 8 illustrates an exemplary wireless network 800, in which some aspects of the present disclosure may be implemented, according to some embodiments of the present disclosure.

Figure 6:
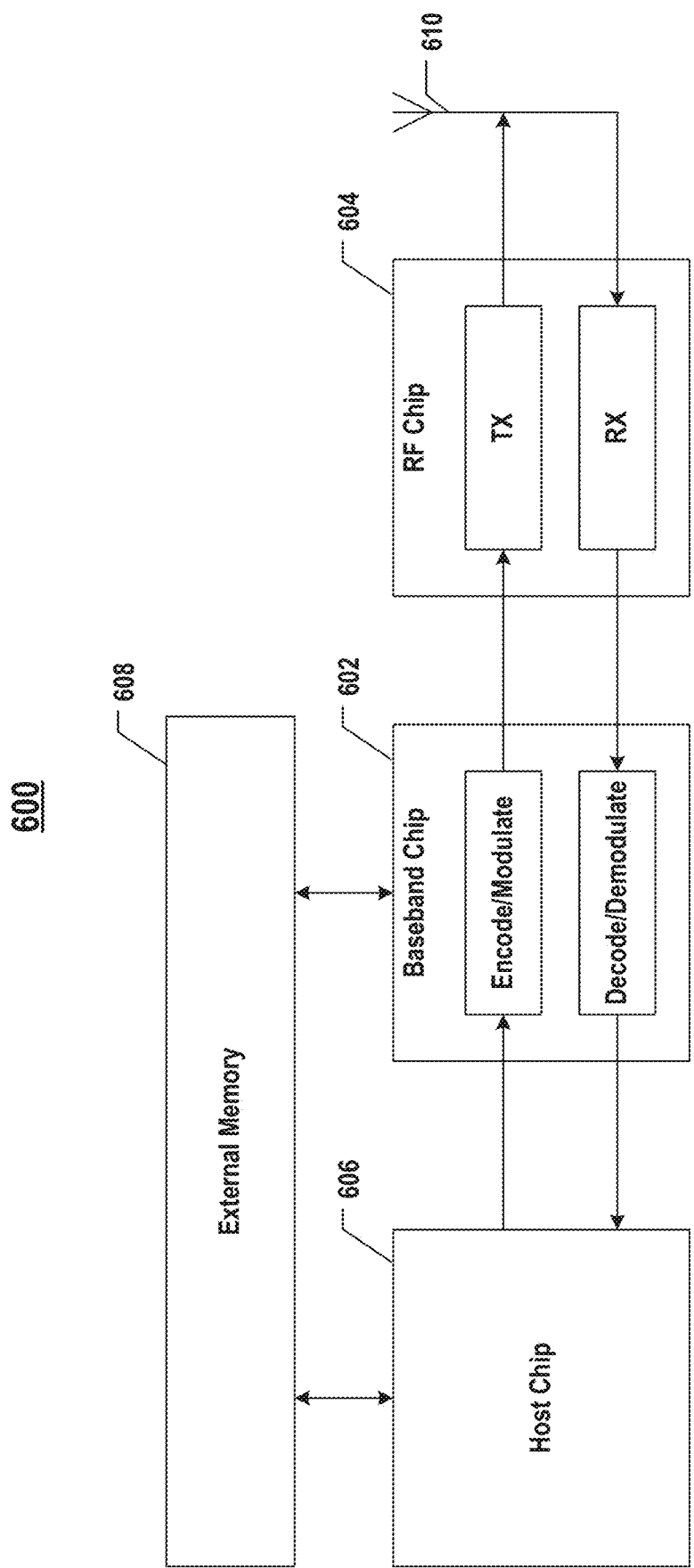
FIG. 6 illustrates a block diagram of an apparatus including a baseband chip, a radio frequency chip, and a host chip, according to some embodiments of the present disclosure.

FIG. 6 illustrates a block diagram of an apparatus 600 including a baseband chip 602, a radio frequency chip 604, and a host chip 606, according to some embodiments of the present disclosure. Apparatus 600 may be an example of any suitable node of wireless network 800 in FIG. 8, such as user equipment 802 or network node 804. As shown in FIG. 6, apparatus 600 may include baseband chip 602, radio frequency chip 604, host chip 606, and one or more antennas 610. In some embodiments, baseband chip 602 is implemented by processor 702 and memory 704, and radio frequency chip 604 is implemented by processor 702, memory 704, and transceiver 706, as described above with respect to FIG. 7. In certain embodiments, baseband chip 602 may, in whole or in part, implement the methods and generate and process the messages shown in FIGS. 4A, 4B, 5A, and 5B. For example, baseband chip 602 in a user equipment may perform the UE steps, generate the messages from the UE, and process the messages from the BS and similarly baseband chip 602 in a base station may perform the BS steps, generate the messages from the BS, and process the messages from the UE. Besides the on-chip memory (also known as "internal memory" or "local memory," e.g., registers, buffers, or caches) on each chip 602, 604, or 606, apparatus 600 may further include an external memory 608 (e.g., the system memory or main memory) that can be shared by each chip 602, 604, or 606 through the system/main bus. Although baseband chip 602 is illustrated as a standalone SoC in FIG. 6, it is understood that in one example, baseband chip 602 and radio frequency chip 604 may be integrated as one SoC; in another example, baseband chip 602 and host chip 606 may be integrated as one SoC; in still another example, baseband chip 602, radio frequency chip 604, and host chip 606 may be integrated as one SoC, as described above.

In the uplink, host chip 606 may generate raw data and send it to baseband chip 602 for encoding, modulation, and mapping. Baseband chip 602 may also access the raw data generated by host chip 606 and stored in external memory 608, for example, using the direct memory access (DMA). Baseband chip 602 may first encode (e.g., by source coding and/or channel coding) the raw data and modulate the coded data using any suitable modulation techniques, such as multi-phase pre-shared key (MPSK) modulation or quadrature amplitude modulation (QAM). Baseband chip 602 may perform any other functions, such as symbol or layer mapping, to convert the raw data into a signal that can be used to modulate the carrier frequency for transmission. In the uplink, baseband chip 602 may send the modulated signal to radio frequency chip 604. Radio frequency chip 604, through the transmitter (Tx), may convert the modulated signal in the digital form into analog signals, i.e., radio frequency signals, and perform any suitable front-end radio frequency functions, such as filtering, up-conversion, or sample-rate conversion. Antenna 610 (e.g., an antenna array) may transmit the radio frequency signals provided by the transmitter of radio frequency chip 604.

In the downlink, antenna 610 may receive radio frequency signals and pass the radio frequency signals to the receiver (Rx) of radio frequency chip 604. Radio frequency chip 604 may perform any suitable front-end radio frequency functions, such as filtering, down-conversion, or sample-rate conversion, and convert the radio frequency signals into low-frequency digital signals (baseband signals) that can be processed by baseband chip 602. In the downlink, baseband chip 602 may demodulate and decode the baseband signals to extract raw data that can be processed by host chip 606. Baseband chip 602 may perform additional functions, such as error checking, de-mapping, channel estimation, descrambling, etc. The raw data provided by baseband chip 602 may be sent to host chip 606 directly or stored in external memory 608.

As shown in FIG. 7, a node 700 may include a processor 702, a memory 704, a transceiver 706. These components are shown as connected to one another by bus 708, but other connection types are also permitted. When node 700 is user equipment 802, additional components may also be included, such as a user interface (UI), sensors, and the like. Similarly, node 700 may be implemented as a blade in a server system when node 700 is configured as core network element 806. Other implementations are also possible.

Transceiver 706 may include any suitable device for sending and/or receiving data. Node 700 may include one or more transceivers, although only one transceiver 706 is shown for simplicity of illustration. An antenna 710 is shown as a possible communication mechanism for node 700. Multiple antennas and/or arrays of antennas may be utilized. Additionally, examples of node 700 may communicate using wired techniques rather than (or in addition to) wireless techniques. For example, network node 804 may communicate wirelessly to user equipment 802 and may communicate by a wired connection (for example, by optical or coaxial cable) to core network element 806. Other communication hardware, such as a network interface card (NIC), may be included as well.

As shown in FIG. 7, node 700 may include processor 702. Although only one processor is shown, it is understood that multiple processors can be included. Processor 702 may include microprocessors, microcontrollers, digital signal processors (DSPs), application-specific integrated circuits (ASICs), field-programmable gate arrays (FPGAs), programmable logic devices (PLDs), state machines, gated logic, discrete hardware circuits, and other suitable hardware configured to perform the various functions described throughout the present disclosure. Processor 702 may be a hardware device having one or many processing cores. Processor 702 may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. Software can include computer instructions written in an interpreted language, a compiled language, or machine code. Other techniques for instructing hardware are also permitted under the broad category of software. Processor 702 may be a baseband chip, such as baseband chip 602 in FIG. 6. Node 700 may also include other processors, not shown, such as a central processing unit of the device, a graphics processor, or the like. Processor 702 may include internal memory (also known as local memory, not shown in FIG. 7) that may serve as memory for L2 data. Processor 702 may include a radio frequency chip, for example, integrated into a baseband chip, or a radio frequency chip may be provided separately. Processor 702 may be configured to operate as a modem of node 700, or may be one element or component of a modem. Other arrangements and configurations are also permitted.

As shown in FIG. 7, node 700 may also include memory 704. Although only one memory is shown, it is understood that multiple memories can be included. Memory 704 can broadly include both memory and storage. For example, memory 704 may include random-access memory (RAM), read-only memory (ROM), static RAM (SRAM), dynamic RAM (DRAM), ferro-electric RAM (FRAM), electrically erasable programmable ROM (EEPROM), CD-ROM or other optical disk storage, hard disk drive (HDD), such as magnetic disk storage or other magnetic storage devices, Flash drive, solid-state drive (SSD), or any other medium that can be used to carry or store desired program code in the form of instructions that can be accessed and executed by processor 702. Broadly, memory 704 may be embodied by any computer-readable medium, such as a non-transitory computer-readable medium. The memory 704 can be the external memory 608 in FIG. 6. The memory 704 may be shared by processor 702 and other components of node 700, such as the unillustrated graphic processor or central processing unit.

As shown in FIG. 8, wireless network 800 may include a network of nodes, such as a UE 802, a network node 804, and a core network element 806. User equipment 802 may be any terminal device, such as a mobile phone, a desktop computer, a laptop computer, a tablet, a vehicle computer, a gaming console, a printer, a positioning device, a wearable electronic device, a smart sensor, or any other device capable of receiving, processing, and transmitting information, such as any member of a vehicle to everything (V2X) network, a cluster network, a smart grid node, or an Internet-of-Things (IoT) node. It is understood that user equipment 802 is illustrated as a mobile phone simply by way of illustration and not by way of limitation.

Network node 804 may be a device that communicates with user equipment 802, such as a wireless access point, a base station (BS), a Node B, an enhanced Node B (eNodeB or eNB), a next-generation NodeB (gNodeB or gNB), a cluster master node, or the like. Network node 804 may have a wired connection to user equipment 802, a wireless connection to user equipment 802, or any combination thereof. Network node 804 may be connected to user equipment 802 by multiple connections, and user equipment 802 may be connected to other access nodes in addition to network node 804. Network node 804 may also be connected to other UEs. It is understood that network node 804 is illustrated by a radio tower by way of illustration and not by way of limitation.

Core network element 806 may serve network node 804 and user equipment 802 to provide core network services. Examples of core network element 806 may include a home subscriber server (HSS), a mobility management entity (MME), a serving gateway (SGW), or a packet data network gateway (PGW). These are examples of core network elements of an evolved packet core (EPC) system, which is a core network for the LTE system. Other core network elements may be used in LTE and in other communication systems. In some embodiments, core network element 806 includes an access and mobility management function (AMF) device, a session management function (SMF) device, or a user plane function (UPF) device, of a core network for the NR system. It is understood that core network element 806 is shown as a set of rack-mounted servers by way of illustration and not by way of limitation.

Core network element 806 may connect with a large network, such as the Internet 808, or another IP network, to communicate packet data over any distance. In this way, data from user equipment 802 may be communicated to other UEs connected to other access points, including, for example, a computer 810 connected to Internet 808, for example, using a wired connection or a wireless connection, or to a tablet 812 wirelessly connected to Internet 808 via a router 814. Thus, computer 810 and tablet 812 provide additional examples of possible UEs, and router 814 provides an example of another possible access node.

A generic example of a rack-mounted server is provided as an illustration of core network element 806. However, there may be multiple elements in the core network including database servers, such as a database 816, and security and authentication servers, such as an authentication server 818. Database 816 may, for example, manage data related to user subscription to network services. A home location register (HLR) is an example of a standardized database of subscriber information for a cellular network. Likewise, authentication server 818 may handle authentication of users, sessions, and so on. In the NR system, an authentication server function (AUSF) device may be the specific entity to perform user equipment authentication. In some embodiments, a single server rack may handle multiple such functions, such that the connections between core network element 806, authentication server 818, and database 816, may be local connections within a single rack.

Each of the elements of FIG. 8 may be considered a node of wireless network 800. More detail regarding the possible implementation of a node is provided by way of example in the description of a node 700 in FIG. 7 above. Node 700 may be configured as user equipment 802, network node 804, or core network element 806 in FIG. 8. Similarly, node 700 may also be configured as computer 810, router 814, tablet 812, database 816, or authentication server 818 in FIG. 8.

FIG. 9A illustrates a method of random access by a user equipment, according to certain embodiments of the present disclosure. The method can include, at 910, sending a trigger message and unique identifier in a first message from the user equipment to a network node, for example, a base station. The trigger message may optionally be omitted. The method can also include, at 920, receiving an acknowledgement at the user equipment in a second message from the network node using the user equipment's unique identifier. Contention resolution for the user equipment can be concluded with only the first message and the second message. Additional communications that are not explicitly part of the random access contention procedure may also occur during this period. For example, downlink control information (DCI) can be sent to the user equipment as shown in FIG. 5A before or in parallel with the second message, without departing from the principle that contention resolution for the user equipment is concluded with only the first message and the second message.

There are several options for the trigger message. For example, the trigger message can be a common control channel message. In this case, the unique identifier may be a hash identifier. The hash identifier may be included in a random access channel MAC control element. The hash identifier can be generated from a 24-bit cyclic redundancy check of the common control channel message.

As another example, the trigger message can be a dedicated control channel message or a dedicated traffic channel message. In these cases, the unique identifier may be a cell radio network temporary identifier. The cell radio network temporary identifier may be included in a cell radio network temporary identifier MAC control element.

The second message can include a temporary cell radio network temporary identifier assigned by the network node. In such a case, the method can further include, at 930, replacing the cell radio network temporary identifier of the user equipment with the temporary cell radio network temporary identifier.

The first message can be Msg1 of a random access contention resolution procedure. The second message can be Msg2 of a random access contention resolution procedure. The second message can include an uplink grant for uplink data on a physical uplink shared channel. The method can also include, at 940, sending the uplink data on the physical uplink shared channel based on the uplink grant.

The first message can include a buffer status report. This buffer status report may be usable by the base station to provide the uplink grant.

FIG. 9B illustrates method of random access of a network node, according to certain embodiments of the present disclosure. As shown in FIG. 9B, the method can include, at 915, receiving a trigger message and unique identifier in a first message from a user equipment at the network node. This may be the same message sent at 910 in FIG. 9A.

The method can also include, at 925, sending an acknowledgement to the user equipment in a second message from the network node using the user equipment's unique identifier. As mentioned above, contention resolution for the user equipment can be concluded with only the first message and the second message.

The method can further include, at 945, receiving uplink data sent by the user equipment after the user equipment receives the uplink grant in the second message. The network node may include in the uplink grant in the second message at 925 based on a buffer status report received at 915 in the first message.

In various aspects of the present disclosure, the functions described herein may be implemented in hardware, software, firmware, or any combination thereof. If implemented in software, the functions may be stored on or encoded as instructions or code on a non-transitory computer-readable medium. Computer-readable media includes computer storage media. Storage media may be any available media that can be accessed by a computing device, such as node 700 in FIG. 7. By way of example, and not limitation, such computer-readable media can include RAM, ROM, EEPROM, CD-ROM or other optical disk storage, HDD, such as magnetic disk storage or other magnetic storage devices, Flash drive, SSD, or any other medium that can be used to carry or store desired program code in the form of instructions or data structures and that can be accessed by a processing system, such as a mobile device or a computer. Disk and disc, as used herein, includes CD, laser disc, optical disc, DVD, and floppy disk where disks usually reproduce data magnetically, while discs reproduce data optically with lasers. Combinations of the above should also be included within the scope of computer-readable media.

According to one aspect of the present disclosure, a user equipment can include at least one processor and at least one memory including computer program code. The at least one memory and the computer program code can be configured to, with the at least one processor, cause the user equipment at least to send a trigger message and unique identifier in a first message from the user equipment to a network node. The at least one memory and the computer program code can also be configured to, with the at least one processor, cause the user equipment at least to receive an acknowledgement at the user equipment in a second message from the network node using the user equipment's unique identifier. Contention resolution for the user equipment can be concluded with only the first message and the second message.

In some embodiments, the trigger message can be a common control channel message.

In some embodiments, the unique identifier can be a hash identifier.

In some embodiments, the hash identifier can be included in a random access channel medium access control (MAC) control element.

In some embodiments, the hash identifier can be generated from a 24-bit cyclic redundancy check of the common control channel message.

In some embodiments, the trigger message can include a dedicated control channel message or a dedicated traffic channel message.

In some embodiments, the unique identifier can be a cell radio network temporary identifier.

In some embodiments, the cell radio network temporary identifier can be included in a cell radio network temporary identifier medium access control (MAC) control element.

In some embodiments, the second message can be a temporary cell radio network temporary identifier assigned by the network node. The at least one memory and the computer program code can also be configured to, with the at least one processor, cause the user equipment at least to replace the cell radio network temporary identifier of the user equipment with the temporary cell radio network temporary identifier.

In some embodiments, the first message can be Msg1 of a random access contention resolution procedure.

In some embodiments, the network node can be a base station.

In some embodiments, the second message can be Msg2 of a random access contention resolution procedure.

In some embodiments, the second message can be an uplink grant for uplink data on a physical uplink shared channel. The at least one memory and the computer program code can also be configured to, with the at least one processor, cause the user equipment at least to send the uplink data on the physical uplink shared channel based on the uplink grant.

In some embodiments, the first message can include a buffer status report.

According to another aspect of the present disclosure, a network node can include at least one processor and at least one memory including computer program code. The at least one memory and the computer program code can be configured to, with the at least one processor, cause the user equipment at least to receive a trigger message and unique identifier in a first message from a user equipment at the network node. The at least one memory and the computer program code can also be configured to, with the at least one processor, cause the user equipment at least to send an acknowledgement to the user equipment in a second message from the network node using the user equipment's unique identifier. Contention resolution for the user equipment can be concluded with only the first message and the second message.

In some embodiments, the trigger message can be a common control channel message.

In some embodiments, the unique identifier can be a hash identifier.

In some embodiments, the hash identifier can be included in a random access channel medium access control (MAC) control element.

In some embodiments, the hash identifier can be generated from a 24-bit cyclic redundancy check of the common control channel message.

In some embodiments, the trigger message can be a dedicated control channel message or a dedicated traffic channel message.

In some embodiments, the unique identifier can be a cell radio network temporary identifier.

In some embodiments, the cell radio network temporary identifier can be included in a cell radio network temporary identifier medium access control (MAC) control element.

In some embodiments, the second message can include a temporary cell radio network temporary identifier assigned by the network node.

In some embodiments, the first message can be Msg1 of a random access contention resolution procedure.

In some embodiments, the network node can be a base station.

In some embodiments, the second message can be Msg2 of a random access contention resolution procedure.

In some embodiments, the second message can include an uplink grant for uplink data on a physical uplink shared channel.

In some embodiments, the first message can include a buffer status report.

In a further aspect of the present disclosure, a method of random access by a user equipment can include sending a trigger message and unique identifier in a first message from the user equipment to a network node. The method can also include receiving an acknowledgement at the user equipment in a second message from the network node using the user equipment's unique identifier. Contention resolution for the user equipment can be concluded with only the first message and the second message.

In some embodiments, the trigger message can be a common control channel message.

In some embodiments, the unique identifier can be a hash identifier.

In some embodiments, the hash identifier can be included in a random access channel medium access control (MAC) control element.

In some embodiments, the hash identifier can be generated from a 24-bit cyclic redundancy check of the common control channel message.

In some embodiments, the trigger message can be a dedicated control channel message or a dedicated traffic channel message.

In some embodiments, the unique identifier can be a cell radio network temporary identifier.

In some embodiments, the cell radio network temporary identifier can be included in a cell radio network temporary identifier medium access control (MAC) control element.

In some embodiments, the second message can include a temporary cell radio network temporary identifier assigned by the network node. The method can further include replacing the cell radio network temporary identifier of the user equipment with the temporary cell radio network temporary identifier.

In some embodiments, the first message can be Msg1 of a random access contention resolution procedure.

In some embodiments, the network node can be a base station.

In some embodiments, the second message can be Msg2 of a random access contention resolution procedure.

In some embodiments, the second message can include an uplink grant for uplink data on a physical uplink shared channel. The method can further include sending the uplink data on the physical uplink shared channel based on the uplink grant.

In some embodiments, the first message can include a buffer status report.

In an additional aspect of the present disclosure, a method of random access of a network node can include receiving a trigger message and unique identifier in a first message from a user equipment at the network node. The method can also include sending an acknowledgement to the user equipment in a second message from the network node using the user equipment's unique identifier. Contention resolution for the user equipment can be concluded with only the first message and the second message.

In some embodiments, the trigger message can be a common control channel message.

In some embodiments, the unique identifier can be a hash identifier.

In some embodiments, the hash identifier can be included in a random access channel medium access control (MAC) control element.

In some embodiments, the hash identifier can be generated from a 24-bit cyclic redundancy check of the common control channel message.

In some embodiments, the trigger message can be a dedicated control channel message or a dedicated traffic channel message.

In some embodiments, the unique identifier can be a cell radio network temporary identifier.

In some embodiments, the cell radio network temporary identifier can be included in a cell radio network temporary identifier medium access control (MAC) control element.

In some embodiments, the second message can include a temporary cell radio network temporary identifier assigned to the user equipment by the network node.

In some embodiments, the first message can be Msg1 of a random access contention resolution procedure.

In some embodiments, the network node can be a base station.

In some embodiments, the second message can be Msg2 of a random access contention resolution procedure.

In some embodiments, the second message can include an uplink grant for uplink data on a physical uplink shared channel.

In some embodiments, the first message can include a buffer status report.

The foregoing description of the specific embodiments will so reveal the general nature of the present disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

Embodiments of the present disclosure have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The Summary and Abstract sections may set forth one or more but not all exemplary embodiments of the present disclosure as contemplated by the inventor(s), and thus, are not intended to limit the present disclosure and the appended claims in any way.

Various functional blocks, modules, and steps are disclosed above. The particular arrangements provided are illustrative and without limitation. Accordingly, the functional blocks, modules, and steps may be re-ordered or combined in different ways than in the examples provided above. Likewise, certain embodiments include only a subset of the functional blocks, modules, and steps, and any such subset is permitted.

The breadth and scope of the present disclosure should not be limited by any of the above-described exemplary embodiments, but should be defined only in accordance with the following claims and their equivalents.

What is claimed is:

1. A user equipment, comprising:
at least one processor; and
at least one memory including computer program code,
wherein the at least one memory and the computer program code are configured to, with the at least one processor, cause the user equipment at least to:
send a trigger message and unique identifier in a first message from the user equipment to a network node; and
receive an acknowledgement at the user equipment in a second message from the network node using the user equipment's unique identifier, wherein contention resolution for the user equipment is concluded with only the first message and the second message,
wherein the trigger message comprises a common control channel message, and the unique identifier comprises a hash identifier, or
wherein the trigger message comprises a dedicated control channel message or a dedicated traffic channel message.

2. The user equipment of claim 1, wherein the hash identifier is included in a random access channel medium access control (MAC) control element.

3. The user equipment of claim 1, wherein the hash identifier is generated from a 24-bit cyclic redundancy check of the common control channel message.

4. The user equipment of claim 1, wherein the unique identifier comprises a cell radio network temporary identifier.

5. The user equipment of claim 4, wherein the cell radio network temporary identifier is included in a cell radio network temporary identifier medium access control (MAC) control element.

6. The user equipment of claim 4, wherein the second message comprises a temporary cell radio network temporary identifier assigned by the network node, wherein the at least one memory and the computer program code are configured to, with the at least one processor, cause the user equipment at least to replace the cell radio network temporary identifier of the user equipment with the temporary cell radio network temporary identifier.

7. The user equipment of claim 1, wherein the first message is Msg1 of a random access contention resolution procedure.

8. The user equipment of claim 1, wherein the network node is a base station.

9. The user equipment of claim 1, wherein the second message is Msg2 of a random access contention resolution procedure.

10. The user equipment of claim 1, wherein the second message comprises an uplink grant for uplink data on a physical uplink shared channel, wherein the at least one memory and the computer program code are configured to, with the at least one processor, cause the user equipment at least to send the uplink data on the physical uplink shared channel based on the uplink grant.

11. The user equipment of claim 1, wherein the first message comprises a buffer status report.

12. A network node, comprising:
at least one processor; and
at least one memory including computer program code,
wherein the at least one memory and the computer program code are configured to, with the at least one processor, cause the network node at least to:
receive a trigger message and unique identifier in a first message from a user equipment at the network node; and
send an acknowledgement to the user equipment in a second message from the network node using the user equipment's unique identifier, wherein contention resolution for the user equipment is concluded with only the first message and the second message,
wherein the trigger message comprises a common control channel message, and the unique identifier comprises a hash identifier, or
wherein the trigger message comprises a dedicated control channel message or a dedicated traffic channel message.

13. The network node of claim 12, wherein the hash identifier is included in a random access channel medium access control (MAC) control element.

14. The network node of claim 12, wherein the hash identifier is generated from a 24-bit cyclic redundancy check of the common control channel message.

15. A method of random access by a user equipment, comprising:
sending a trigger message and unique identifier in a first message from the user equipment to a network node; and
receiving an acknowledgement at the user equipment in a second message from the network node using the user equipment's unique identifier, wherein contention resolution for the user equipment is concluded with only the first message and the second message,
wherein the trigger message comprises a common control channel message, and the unique identifier comprises a hash identifier, or
wherein the trigger message comprises a dedicated control channel message or a dedicated traffic channel message.

* * * * *